United States Patent
Ahn et al.

(10) Patent No.: US 10,599,734 B2
(45) Date of Patent: Mar. 24, 2020

(54) MATCHMAKING VIDEO CHATTING PARTNERS

(71) Applicant: HYPERCONNECT, INC., Seoul (KR)

(72) Inventors: Sangil Ahn, Cheongju-si (KR); Kangsik Jung, Seoul (KR); Hyountaek Yong, Seoul (KR); Sangpil Yoon, Seongnam-si (KR)

(73) Assignee: HYPERCONNECT, INC., Seoul (KR)

( * ) Notice: Subject to any disclaimer, the term of this patent is extended or adjusted under 35 U.S.C. 154(b) by 254 days.

(21) Appl. No.: 15/612,973

(22) Filed: Jun. 2, 2017

(65) Prior Publication Data

US 2017/0351770 A1 Dec. 7, 2017

(30) Foreign Application Priority Data

Jun. 3, 2016 (KR) .................. 10-2016-0069563

(51) Int. Cl.
*G06F 16/95* (2019.01)
*G06F 16/9535* (2019.01)
(Continued)

(52) U.S. Cl.
CPC .... *G06F 16/9535* (2019.01); *G06F 16/24578* (2019.01); *G06Q 50/01* (2013.01);
(Continued)

(58) Field of Classification Search
CPC .................. G06F 16/9535; G06F 16/24578
See application file for complete search history.

(56) References Cited

U.S. PATENT DOCUMENTS

2004/0076280 A1* 4/2004 Ando ............... G08G 1/202
379/220.01
2011/0289433 A1 11/2011 Whalin et al.

FOREIGN PATENT DOCUMENTS

CN 101827317 A 9/2010
CN 104737097 A 6/2015
(Continued)

OTHER PUBLICATIONS

First Office Action dated Dec. 8, 2016 of corresponding Korean Patent Application 10-2016-0069563—5 pages.
(Continued)

*Primary Examiner* — Loc Tran
(74) *Attorney, Agent, or Firm* — Knobbe Martens Olson & Bear LLP

(57) ABSTRACT

A mediating method may include: preparing at least two lists that respectively correspond to different values of a specific feature and that each of which includes at least one item; receiving first information about a first terminal or a user of the first terminal from the first terminal; deriving a value corresponding to the specific feature using the received first information; selecting a first list from among the at least two lists using the derived value; determining whether a first item matching the user of the first terminal is present in the at least one item included in the first list using the first information; and when it is determined that the first item is present in the first list, transmitting second information corresponding to the first item to the first terminal, or transmitting third information corresponding to the first terminal to a second terminal corresponding to the first item.

13 Claims, 10 Drawing Sheets

(51) Int. Cl.
  *G06F 16/2457*    (2019.01)
  *G06Q 50/00*     (2012.01)
  *H04L 29/06*     (2006.01)
  *H04L 29/08*     (2006.01)

(52) U.S. Cl.
  CPC .......... *H04L 65/1069* (2013.01); *H04L 67/30* (2013.01); *H04L 65/40* (2013.01)

(56) References Cited

FOREIGN PATENT DOCUMENTS

| | | |
|---|---|---|
| CN | 105247845 A | 1/2016 |
| CN | 105308638 A | 2/2016 |
| JP | 2002-109025 A | 4/2002 |
| JP | 2013-020485 A | 1/2013 |
| WO | 2013-081345 A1 | 6/2013 |

OTHER PUBLICATIONS

Office Action of corresponding Chinese Patent Application No. 2017-10407120.7—11 pages (dated Aug. 5, 2019).

* cited by examiner

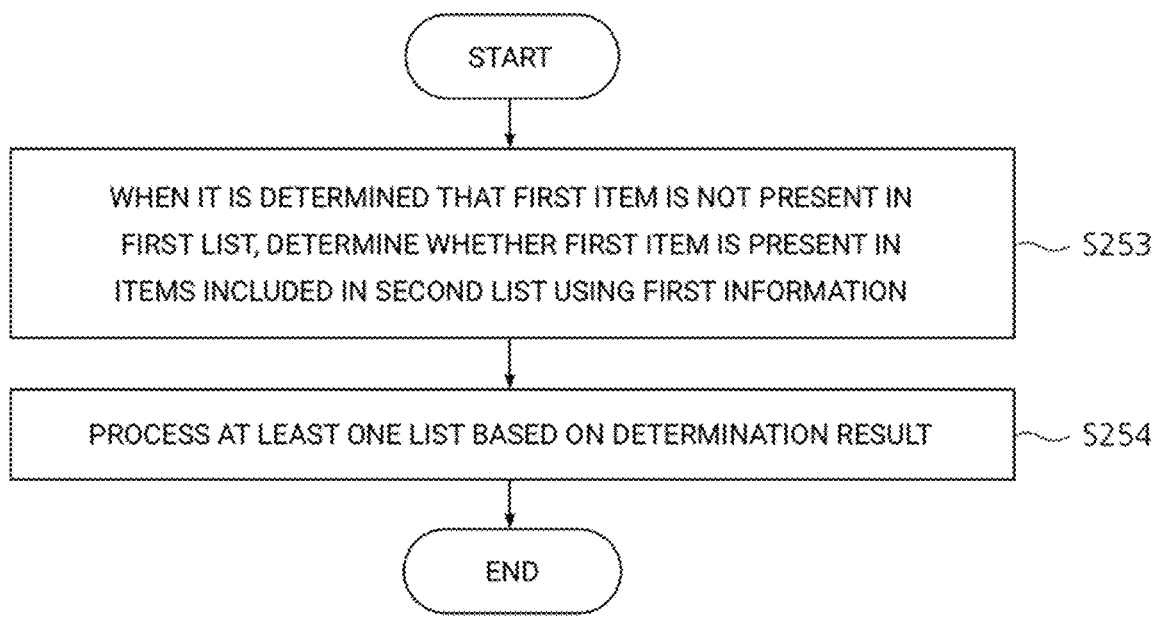

MATCHMAKING VIDEO CHATTING PARTNERS

CROSS-REFERENCE TO RELATED APPLICATION

This application claims the benefit of Korean Patent Application No. 10-2016-0069563, filed on Jun. 3, 2016, in the Korean Intellectual Property Office, the disclosure of which is incorporated herein in its entirety by reference.

BACKGROUND

1. Field

One or more embodiments relate to a mediating method, a mediating device, and a mediating system, which are capable of matching a plurality of terminals more effectively.

2. Description of the Related Art

With the developments of communication technologies and the miniaturization of electronic devices, personal terminals have become widely spread to general customers. In particular, personal portable terminals, such as smart phones or smart tablets, have recently been widely used. Most terminals include a communication function. A user may search on the Internet using a terminal or may exchange messages with another user.

Also, with the developments of compact camera technologies and display technologies, most smart phones include a camera module and a display. A user may use the terminal to capture an image or a video clip. The user may confirm the captured image or video clip through the display included in the terminal.

Also, the user may share the captured image or video clip with another user using the communication function of the terminal. The user may send a previously captured image or video clip to another user. Also, the user may send an image or a video clip, which is being currently captured by the camera included in the terminal, to another user in real time.

Also, at the same time, another user may send an image or a video clip, which is being currently captured by a camera included in the terminal of another user, to the user in real time. The display included in the terminal of the user may simultaneously display the image that is being currently captured by the camera included in the terminal of the user and the image that is being currently captured by the camera included in the terminal of another user. In other words, the user and another user may make a video call to each other using their own terminals.

The user and another user may or may not be acquainted with each other. A server may be connected to a plurality of terminals including the terminal of the user and the terminal of another user. The server may assist the user and another user to make a video call to each other. The server may match the terminal of the user and the terminal of another user among the plurality of terminals connected to the server. In this manner, the server may mediate between the terminal of the user and the terminal of another user. Therefore, even though the user and another user are not acquainted with each other, the user and another user may make a video call to each other through the mediation of the server.

SUMMARY

Some example embodiments may provide a mediating method, a mediating device, and a mediating system, which are capable of matching a plurality of terminals more effectively.

Some example embodiments may provide a mediating method, a mediating device, and a mediating system, which are capable of mediating terminals of a plurality of users more effectively.

Some example embodiments may provide a mediating method, a mediating device, and a mediating system, which are capable of performing mediation so that a terminal of a user matches a terminal of another user that is more suitable for the user among a plurality of users.

Some example embodiments may provide a mediating method, a mediating device, and a mediating system, which are capable of performing mediation so that different users make a video call more effectively using their own terminals.

Additional aspects will be set forth in part in the description which follows and, in part, will be apparent from the description, or may be learned by practice of the presented embodiments.

In some example embodiments, a mediating method may comprise: preparing at least two lists that respectively correspond to different values of a specific feature and that each of which includes at least one item; receiving first information about a first terminal or a user of the first terminal from the first terminal; deriving a value corresponding to the specific feature using the received first information; selecting a first list from among the at least two lists using the derived value; determining whether a first item matching the user of the first terminal is present in the at least one item included in the first list using the first information; and when it is determined that the first item is present in the first list, transmitting second information corresponding to the first item to the first terminal, or transmitting third information corresponding to the first terminal or the user of the first terminal to a second terminal corresponding to the first item.

In some example embodiments, the items included in the at least two lists may correspond to waiting users who wait to be mediated or terminals of the waiting users.

In some example embodiments, the mediating method may further comprise, when it is determined that the first item is present in the first list, removing the first item from the first list.

In some example embodiments, the mediating method may further comprise, when it is determined that the first item is not present in the first list, adding an item corresponding to the user of the first terminal to the first list.

In some example embodiments, the mediating method may further comprise, after the adding of the item corresponding to the user of the first terminal to the first list: receiving fourth information about a third terminal or a user of the third terminal from the third terminal; deriving a value corresponding to the specific feature using the received fourth information; selecting the first list from among the at least two lists using the derived value; determining whether a second item matching the user of the third terminal is present in the at least one item included in the first list using the fourth information; and when it is determined that the second item is present in the first list, transmitting fifth information corresponding to the second item to the third terminal, or transmitting sixth information corresponding to the third terminal or the user of the third terminal to a fourth terminal corresponding to the second item.

In some example embodiments, the at least two lists may include a second list that is different from the first list, at least one item included in the second list may correspond to a second value of the specific feature, and the mediating method may further comprise, after the adding of the item corresponding to the user of the first terminal to the first list, adding the item corresponding to the user of the first terminal to the second list when the user of the first terminal is not mediated until a specific time has elapsed.

In some example embodiments, the first list may correspond to a first value of the specific feature, and at least one of the at least one item included in the first list may correspond to the first value.

In some example embodiments, the at least two lists may include a second list that is different from the first list, at least one item included in the second list may correspond to a second value of the specific feature, and the mediating method may further comprise: when it is determined that the first item is not present in the first list, determining whether the first item is present in the at least one item included in the second list using the first information; and when it is determined that the first item is present in the second list, transmitting the second information corresponding to the first item in the second list to the first terminal, or transmitting the third information corresponding to the first terminal or the user of the first terminal to the second terminal corresponding to the first item.

In some example embodiments, the first value and the second value may have an inclusion relation.

In some example embodiments, the mediating method may further comprise, when it is determined that the first item is not present in the second list, adding an item corresponding to the user of the first terminal to the first list or the second list.

In some example embodiments, the first information may include at least one of location information of the first terminal, and location information, gender information, age information, job information, interest information, ethnicity information, religion information, command-of-language information, or favorite partner condition information of the user of the first terminal.

In some example embodiments, the favorite partner condition information of the user of the first terminal may include at least one of location information, gender information, age information, job information, interest information, ethnicity information, religion information, command-of-language information, and favorite partner condition information of a partner whom the user of the first terminal wants to match.

In some example embodiments, the mediating method may further comprise: determining whether the first item matching the user of the first terminal is present in the at least one item included in the first list; calculating correspondences between the user of the first terminal and the items included in the first list using the first information; determining whether a correspondence having a threshold value or more is present in the calculated correspondences; and determining whether the first item is present in the first list using the determination result.

In some example embodiments, each of the at least one item included in the first list may correspond to a waiting user who waits to be mediated, each of the at least one item may include information about the waiting user corresponding to the item, and the calculating of the correspondences may comprise: selecting a specific item from among the at least one item included in the first list; selecting at least one first factor from among factors included in the first information; calculating correspondence scores of the at least one first factor by comparing the at least one first factor with a second factor corresponding to the at least one first factor among factors included in information about the waiting user corresponding to the specific item; and calculating a correspondence between the user of the first terminal and the specific item by calculating a weighted sum of the calculated correspondence scores.

In some example embodiments, the specific feature may be location, gender, age, job, interest, ethnicity, religion, language, favorite partner condition, or a combination thereof.

In some example embodiments, a mediating device may comprise: a storage configured to store at least two lists that respectively correspond to different values of a specific feature and that each of which includes at least one item; an input interface configured to receive first information about a first terminal or a user of the first terminal from the first terminal; a controller configured to derive a value corresponding to the specific feature using the received first information, select a first list from among the at least two lists using the derived value, and determine whether a first item matching the user of the first terminal is present in the at least one item included in the first list using the first information; and an output interface configured to, when it is determined that the first item is present in the first list, transmit second information corresponding to the first item to the first terminal, or transmit third information corresponding to the first terminal or the user of the first terminal to a second terminal corresponding to the first item.

In some example embodiments, a mediating system may comprise: a mediating device; and at least two terminals connected to the mediating device. The mediating device may store at least two lists that respectively correspond to different values of a specific feature and that each of which includes at least one item. The items included in the at least two lists may correspond to terminals of waiting users who wait to be mediated, or the waiting users. The mediating device may receive first information about a first terminal or a user of the first terminal among the at least two terminals. The mediating device may derive a value corresponding to the specific feature using the received first information. The mediating device may select a first list from among the at least two lists using the derived value. The mediating device may determine whether a first item matching the user of the first terminal is present in the at least one item included in the first list using the first information. When it is determined that the first item is present in the first list, the mediating device may transmit second information corresponding to the first item to the first terminal, or transmit third information corresponding to the first terminal or the user of the first terminal to a second terminal corresponding to the first item.

BRIEF DESCRIPTION OF THE DRAWINGS

These and/or other aspects will become apparent and more readily appreciated from the following description of embodiments, taken in conjunction with the accompanying drawings in which:

FIG. 10 is a flowchart of a process of processing at least one list based on a determination result, according to another embodiment.

DETAILED DESCRIPTION

Advantages and features and a method of achieving the same will be more clearly understood from embodiments described below in detail with reference to the accompanying drawings. However, the present disclosure is not limited to the following embodiments and may be implemented in various different forms. The following embodiments are provided merely to complete disclosure and to provide those of ordinary skill in the art with the category of the present disclosure. The present disclosure is defined only by the claims. Wherever possible, the same reference numbers will be used throughout the specification to refer to the same or like components.

Also, it will be understood that although the terms "first", "second", etc. may be used herein to describe various components, these components should not be limited by these terms. These terms are only used to distinguish one component from another. Therefore, a first component used herein may be a second component within the technical scope of the present disclosure.

The terminology used herein is for the purpose of describing particular embodiments only and is not intended to limit the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated components and/or steps, but do not preclude the presence or addition of one or more other components and/or steps.

Unless otherwise defined, all terms used herein have the same meaning as commonly understood by those of ordinary skill in the art. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

Hereinafter, a mediating method, a mediating device, and a mediating system, according to embodiments, will be described in detail with reference to FIGS. 1 to 10.

Figure 1:
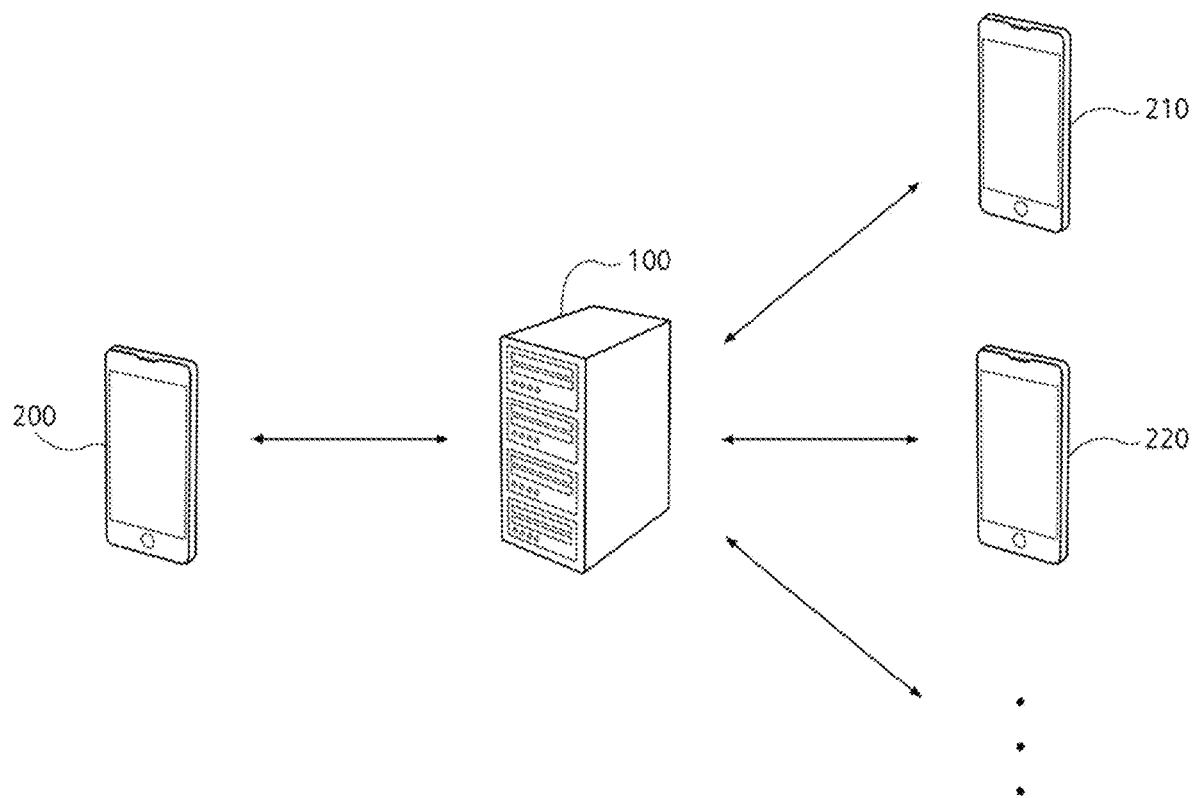
FIG. 1 is a network configuration diagram illustrating an environment in which a mediating system according to an embodiment operates.

FIG. 1 is a network configuration diagram illustrating an environment in which a mediating system according to an embodiment operates. Referring to FIG. 1, the environment in which the mediating system operates may include a mediating device 100 and at least two terminals 200, 210, and 220 connected to the mediating device 100.

The mediating device 100 may be a server. The mediating device 100 may be connected to a communication network. The mediating device 100 may be connected to an external device via the communication network. The mediating device 100 may transmit data to the external device or receive data from the external device.

The communication network may be implemented using a wired communication network, a wireless communication network, or a composite communication network. The communication network may include a mobile communication network such as 3G, Long Term Evolution (LTE), or LTE-A. The communication network may include a wired or wireless communication network such as Wi-Fi, Universal Mobile Telephone System/General Packet Radio Service (UMTS/GPRS), or Ethernet. The communication network may include a short-range communication network such as Magnetic Secure Transmission (MST), Radio Frequency Identification (RFID), Near Field Communication (NFC), ZigBee, Z-Wave, Bluetooth, Bluetooth Low Energy (BLE), or InfraRed (IR) communication. The communication network may include Local Area Network (LAN), Metropolitan Area Network (MAN), or Wide Area Network (WAN).

The terminals 200, 210, and 220 may be connected to the mediating device 100. Referring to the embodiment illustrated in FIG. 1, the environment in which the mediating system operates may include a first terminal 200, a second terminal 210, and a third terminal 220. For convenience, only three terminals 200, 210, and 220 are illustrated in FIG. 1, but in some embodiments, more terminals may be connected to the mediating device 100.

The terminals 200, 210, and 220 may be connected to the communication network. The terminals 200, 210, and 220 may be connected to an external device via the communication network. The terminals 200, 210, and 220 may be connected to the mediating device 100 via the communication network. The terminals 200, 210, and 220 may transmit data to the mediating device 100 or receive data from the mediating device 100.

The terminals 200, 210, and 220 may be, for example, desktop computers, laptop computers, smart phones, smart tablets, smart watches, mobile terminals, digital cameras, wearable devices, or portable electronic devices. The terminals 200, 210, and 220 may execute programs or applications.

The mediating device 100 assists mutual connection between at least two of the terminals 200, 210, and 220 connected to the mediating device 100. In other words, the mediating device 100 may mediate mutual connection between the at least two terminals 200, 210, and 220.

For example, the mediating device 100 may receive a mediating request from the first terminal 200. The mediating device 100 may select a terminal matching the first terminal 200 from among the terminals 210 and 220 other than the first terminal 200 in response to the mediating request. Also, the mediating device 100 may select a terminal of another user matching a user of the first terminal 200 from among the terminals 210 and 220 other than the first terminal 200 in response to the mediating request. For example, the mediating device 100 may select the second terminal 210 in response to the mediating request.

The mediating device 100 may transmit information about the first terminal 200 to the selected second terminal 210 or transmit information about the second terminal 210 to the first terminal 200. The first terminal 200 or the second terminal 210 may be connected to the second terminal 210 or the first terminal 200 using the information received from the mediating device 100. The first terminal 200 and the second terminal 210, which are connected to each other, may exchange messages, files, images, or videos with each other. Also, the first terminal 200 and the second terminal 210, which are connected to each other, may make a phone call or a video call to each other. The first terminal 200 and the second terminal 210 may exchange messages with each other via or without via the mediating device 100.

Users of the terminals 200, 210, and 220 may or may not be acquainted with one another. Therefore, the terminals 200, 210, and 220 of the users who are not acquainted with one another may be connected to one another through the mediation of the mediating device 100. In this manner, the users of the terminals 200, 210, and 220 may communicate with unacquainted persons and expand relationships through the mediation of the mediating device 100.

Figure 2:
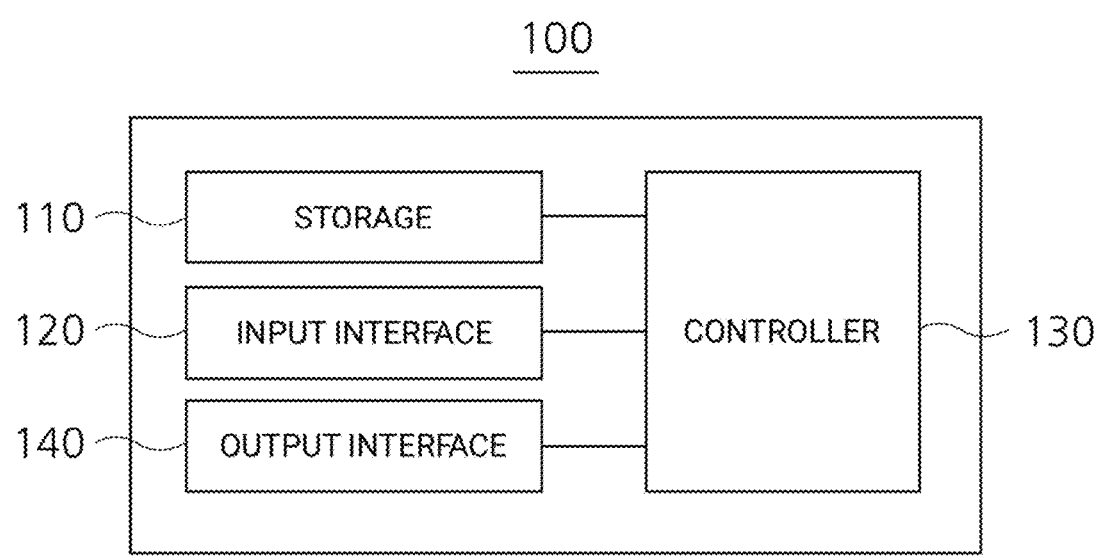
FIG. 2 is a block diagram illustrating a configuration of a mediating device according to an embodiment.

FIG. 2 is a block diagram illustrating the configuration of the mediating device 100 according to an embodiment. Referring to FIG. 2, the mediating device 100 according to an embodiment may include a storage 110, an input interface 120, a controller 130, and an output interface 140.

The storage 110 may store data. The storage 110 may store data to be transmitted to the exterior, or may store data received from the exterior. The storage 110 may store data to be transmitted to the terminals 200, 210, and 220. The storage 110 may store data received from the terminals 200, 210, and 220.

The storage 110 may be a volatile memory or a non-volatile memory. The storage 110 may be, for example, flash memory, read-only memory (ROM), random access memory (RAM), electrically erasable read-only memory (EEROM), erasable programmable read-only memory (EPROM), electrically erasable and programmable read-only memory (EEPROM), hard disk drive (HDD), or register. The storage 110 may include, for example, a file system, a database, or an embedded database.

The input interface 120 may receive data from the exterior. The input interface 120 may receive data from the terminals 200, 210, and 220. The data received by the input interface 120 may be stored in the storage 110.

The input interface 120 may include a long-range network interface such as a 3G module, an LTE module, an LTE-A module, a Wi-Fi module, a WiGig module, an Ultra Wide Band (UWB) module, or a LAN card. Also, the input interface 120 may include a short-range network interface such as an MST module, a Bluetooth module, an NFC module, an RFID module, a ZigBee module, a Z-Wave module, or an IR module. Furthermore, the input interface 120 may include other network interfaces.

The controller 130 may control the components of the mediating device 100 and the operation of the mediating device 100. The controller 130 may control the operation of the mediating device 100 in response to the request received by the input interface 120. The controller 130 may control the operation of the mediating device 100 using the data received from the terminals 200, 210, and 220.

Also, the controller 130 may perform an arithmetic operation. The controller 130 may perform an arithmetic operation using the data stored in the storage 110. The controller 130 may perform control such that the result of the arithmetic operation is stored in the storage 110. The controller 130 may perform control such that the result of the arithmetic operation is output by the output interface 140.

The controller 130 may be connected to the components included in the mediating device 100. The controller 130 may include, for example, a central processing unit (CPU), a graphic processing unit (GPU), a micro controller unit (MCU), or a microprocessor.

The output interface 140 may output data. The output interface 140 may transmit data to the exterior. The output interface 140 may transmit data stored in the storage 110 to the exterior. The output interface 140 may transmit the arithmetic result of the controller 130.

The output interface 140 and the input interface 120 may be implemented by one hardware or individual hardwares. The output interface 140 may include a long-range network interface such as a 3G module, an LTE module, an LTE-A module, a Wi-Fi module, a WiGig module, a UWB module, or a LAN card. Also, the output interface 140 may include a short-range network interface such as an MST module, a Bluetooth module, an NFC module, an RFID module, a ZigBee module, a Z-Wave module, or an IR module. Also, the output interface 140 may include other network interfaces.

Hereinafter, specific operations of the mediating device 100 and the terminals 200, 210, and 220 in the mediating method according to an embodiment will be described in detail with reference to FIGS. 3 to 10.

Figure 3:
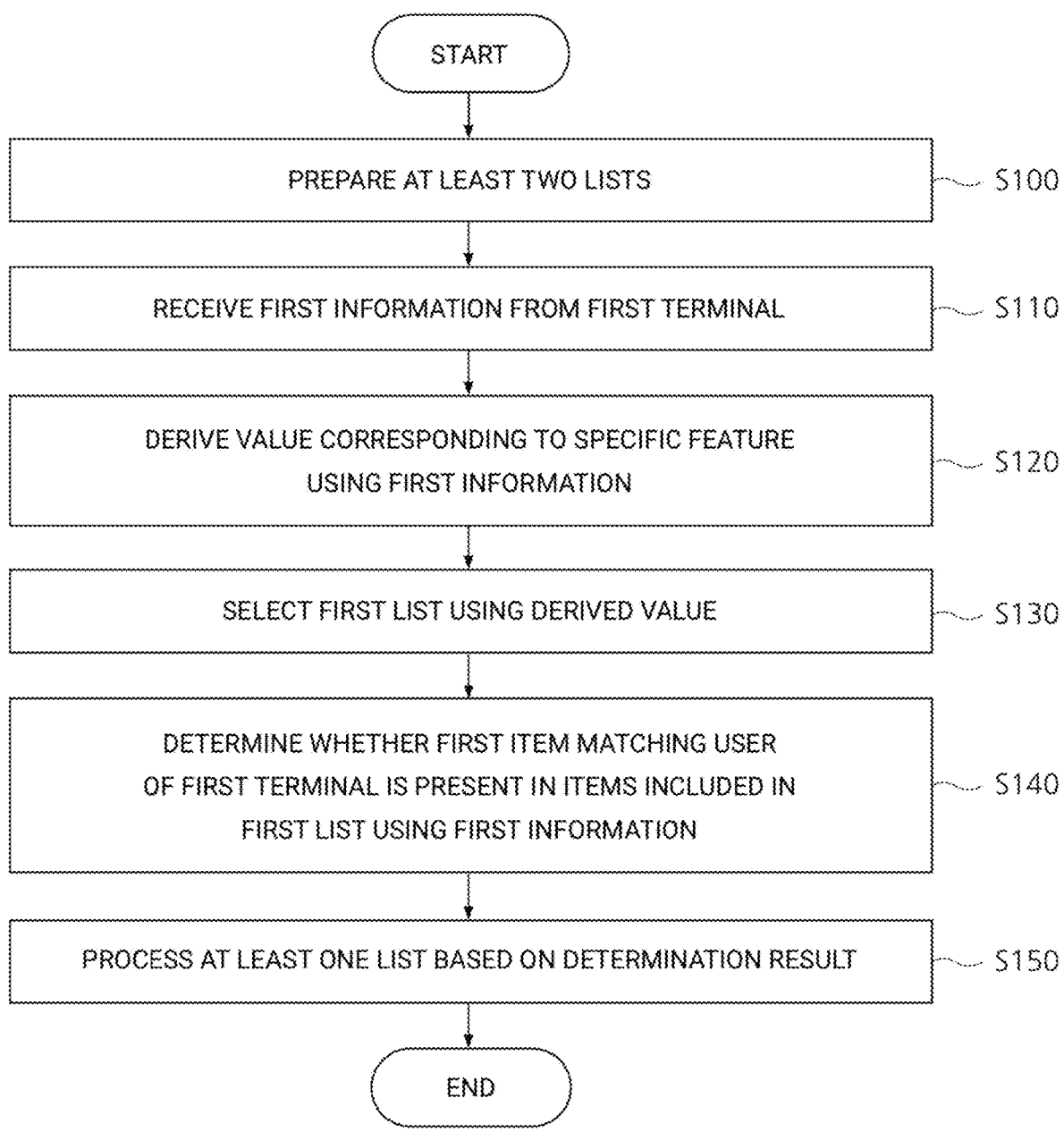
FIG. 3 is a flowchart of a mediating method according to an embodiment.

FIG. 3 is a flowchart of the mediating method according to an embodiment. Referring to FIG. 3, the mediating method according to an embodiment may include operation S100 of preparing at least two lists that respectively correspond to different values of a specific feature and that each of which includes at least one item. The mediating device 100 may prepare at least two lists. The storage 110 of the mediating device 100 may store the at least two lists.

Figure 4:
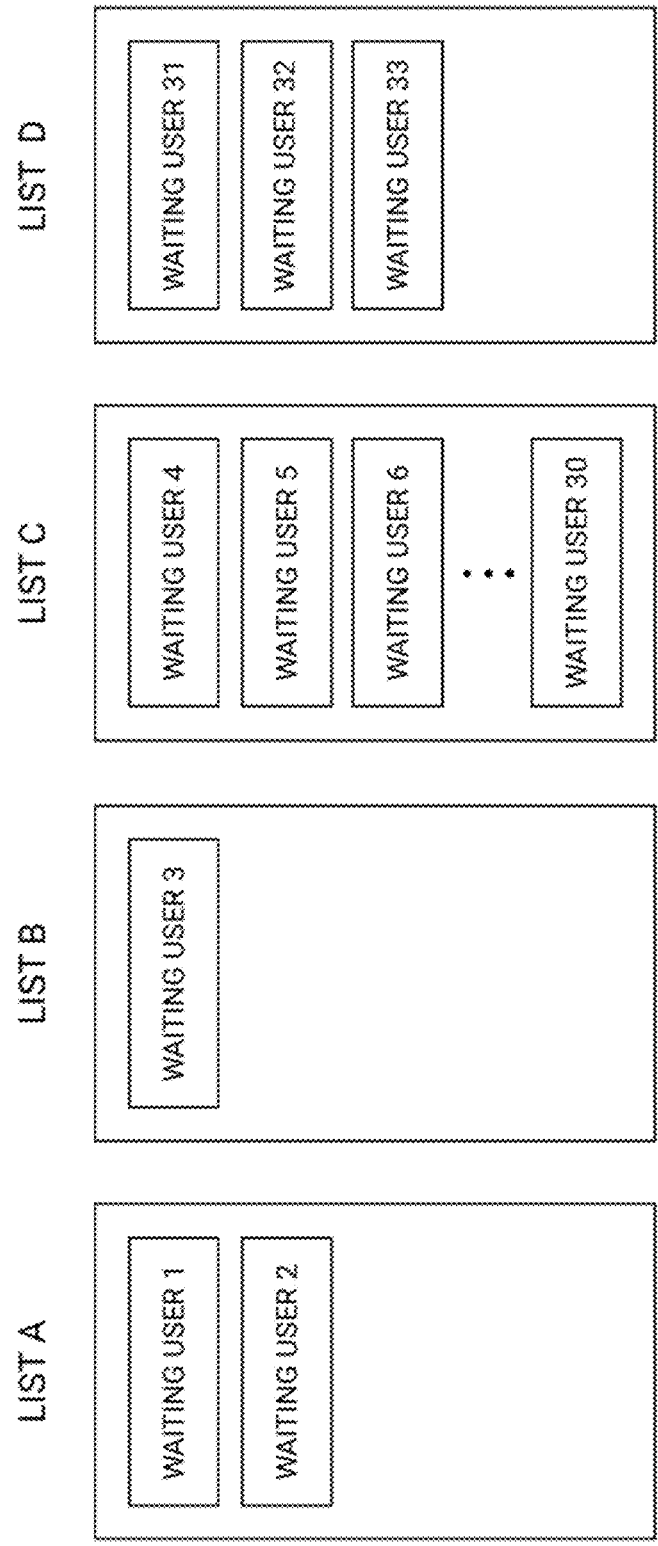
FIG. 4 is a reference diagram for describing a process of preparing at least two lists, according to an embodiment.

FIG. 4 is a reference diagram for describing operation S100 of preparing the at least two lists, according to an embodiment. As illustrated in FIG. 4, the storage 110 of the mediating device 100 may store "list A", "list B", "list C", and "list D".

Each of the at least two lists may include at least one item. The items included in the at least two lists may correspond to waiting users who wait to be mediated or terminals of the waiting users. The items may correspond to specific waiting users. The specific waiting users corresponding to the items may be different from each other. Each of the items may include information or an identifier of the specific waiting user.

The information of the specific waiting user may include, for example, at least one of location information, gender information, age information, job information, interest information, ethnicity information, religion information, command-of-language information, and favorite partner condition information of the specific waiting user. The favorite partner condition information of the specific waiting user may include at least one of location information, gender information, age information, job information, interest information, ethnicity information, religion information, command-of-language information, and favorite partner condition information of a partner whom the specific waiting user wants to match.

According to another embodiment, the items may correspond to terminals used by the specific waiting users. The terminals corresponding to the items may be different from each other. Each of the items may include information or an identifier of the terminal corresponding to the items. The information of the terminal may include location information, network address information, or model information of the terminal corresponding to the item.

For example, as illustrated in FIG. 4, the list A may include two items. The two items included in the list A may respectively correspond to "waiting user 1" and "waiting user 2". Also, the list B may include a single item. The single item included in the list B may correspond to "waiting user 3". Also, the list C may include 27 items. The 27 items included in the list C may respectively correspond to "waiting user 4" to "waiting user 30". Also, the list D may include three items. The three items included in the list D may respectively correspond to "waiting user 31", "waiting user 32", and "waiting user 33".

The at least two lists may respectively correspond to different values of a specific feature. The lists may respectively correspond to specific values of the specific feature. The specific values corresponding to the lists may be different from each other.

The specific feature may be location, gender, age, job, interest, ethnicity, religion, language, favorite partner condition, or a combination thereof. For example, when the specific feature is "location", the lists may correspond to different specific location values. For example, the list A may correspond to "Seoul". The list B may correspond to "Gangnam". The list C may correspond to "Korea". The list D may correspond to "New York".

As another example, when the specific feature is "interest", the lists may correspond to names of different specific matters of interest. For example, the list A may correspond to "basketball". The list B may correspond to "soccer". The list C may correspond to "sports". The list D may correspond to "music".

As another example, when the specific feature is "favorite partner condition", the lists may correspond to different conditions for a favorite partner. For example, the list A may correspond to a condition that "the partner's interest is a basketball". The list B may correspond to a condition that "the partner's age is teenage". The list C may correspond to a condition that "the partner's location is within the East Asian cultural area". The list D may correspond to a condition that "the language used by the partner is English".

At least one of the at least one item included in the lists may correspond to a value of a specific feature corresponding to the list. In other words, when the first list included in the plurality of lists corresponds to a first value of a specific feature, at least one item included in the first list may correspond to the first value.

For example, when the specific feature is "location" and the list A corresponds to "Seoul", at least one item included in the list A may correspond to "Seoul". Therefore, the location of the "waiting user 1" or the "waiting user 2" may be "Seoul".

As another example, when the specific feature is "interest" and the list A corresponds to "basketball", at least one item included in the list A may correspond to "basketball". Therefore, the interest of the "waiting user 1" or the "waiting user 2" may be "basketball".

As another example, when the specific feature is "favorite partner condition" and the list A corresponds to a condition that the partner's interest is "basketball", at least one item included in the list A may correspond to the condition. Therefore, the "waiting user 1" or the "waiting user 2" may prefer the partner who is interested in the basketball".

At least a part of the values of the specific feature corresponding to the lists may have a specific relation. The specific relation may be an inclusion relation. For example, it is assumed that the at least two lists include a first list and a second list that is different from the first list. The first list may correspond to a first value of a specific feature, and the second list may correspond to a second value of the specific feature. The first value and the second value may have an inclusion relation.

An entire range represented by the first value may be included in a range represented by the second value. For example, the specific feature may be "location", the first value may be "Seoul", and the second value may be "Korea". Also, a part of the range represented by the first value may be included in the range represented by the second value. For example, the specific feature may be "favorite partner condition", the first value may be that "the partner's age is in a range between 20 years old and 30 years old", and the second value may be that "the partner's age is in a range between 25 years old and 35 years old".

According to another embodiment, the first value may be a lower-level concept of the second value. For example, the specific feature may be "interest", the first value may be "basketball", and the second value may be "sports".

According to another embodiment, the at least two lists may include a first list, a second list, a third list, which are different from one another. The first list may correspond to a first value of a specific feature, the second list may correspond to a second value of the specific feature, and the third list may correspond to a third value of the specific feature. The first value and the second value may have an inclusion relation. The first value and the third value may have an inclusion relation. Also, the second value and the third value may have an inclusion relation.

Figure 5:
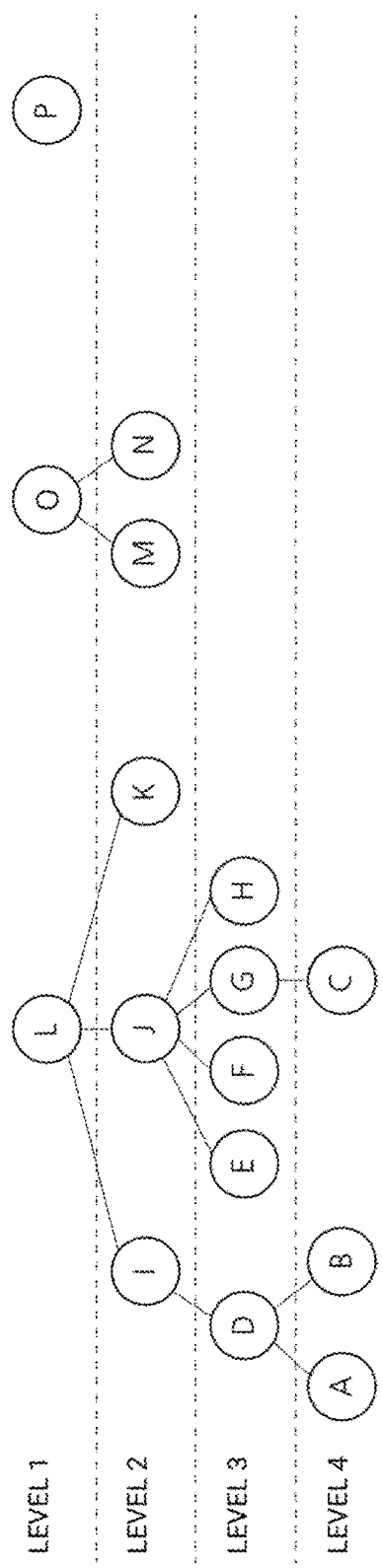
FIG. 5 is a graph showing a relation between at least two lists, according to an embodiment.

FIG. 5 is a graph showing a relation between at least two lists, according to an embodiment. The graph shown in FIG. 5 includes 16 vertices and 13 edges connecting the vertices to one another. Each of the vertices included in the graph may correspond to one list. The edge connecting two vertices may indicate that two values corresponding to two lists corresponding to the two vertices have an inclusion relation.

Referring to FIG. 5, the at least two lists may include 16 lists from a list A to a list P. The list A may correspond to a vertex A of FIG. 5. The list B may correspond to a vertex B of FIG. 5. Similarly, the lists C to P may respectively correspond to vertices C to P of FIG. 5. The list A may correspond to a first value of a specific feature. The list B may correspond to a second value of the specific feature. Similarly, the lists C to P may respectively correspond to third to sixteenth values of the specific feature.

The graph showing the relation between the at least two lists may include two vertices connected to each other by one edge: a first vertex included at a lower level and a second vertex included at a higher level. A range represented by a value corresponding to a list corresponding to the first vertex may be included in a range represented by a value corresponding to a list corresponding to the second vertex. For example, referring to FIG. 5, the vertex A and the vertex D may be connected to each other by an edge. The vertex A may be included at level 4, and the vertex D may be included at level 3. A range represented by a value corresponding to a list corresponding to the vertex A may be included in a range represented by a value corresponding to a list corresponding to the vertex D.

A depth of the graph showing the relation between the at least two lists may be 1 or more. In the graph shown in FIG. 5, a vertex longest connected by an edge from a vertex L, which is a root, may be the vertex A, the vertex B, or the vertex C. Since a path from the vertex L to the vertex A, the vertex B, or the vertex C includes four vertices and three edges, the graph shown in FIG. 5 may have a depth of 4.

Also, a depth of the graph showing the relation between the at least two lists may be 3 or more. In other words, the inclusion relations of the values corresponding to the lists may be chained.

For example, referring to FIG. 5, the range represented by the first value corresponding to the list A may be included in the range represented by the fourth value corresponding to the list D. Also, the range represented by the fourth value may be included in the range represented by the ninth value corresponding to the list I. Also, the range represented by the ninth value may be included in the range represented by the twelfth value corresponding to the list L.

Figure 6:
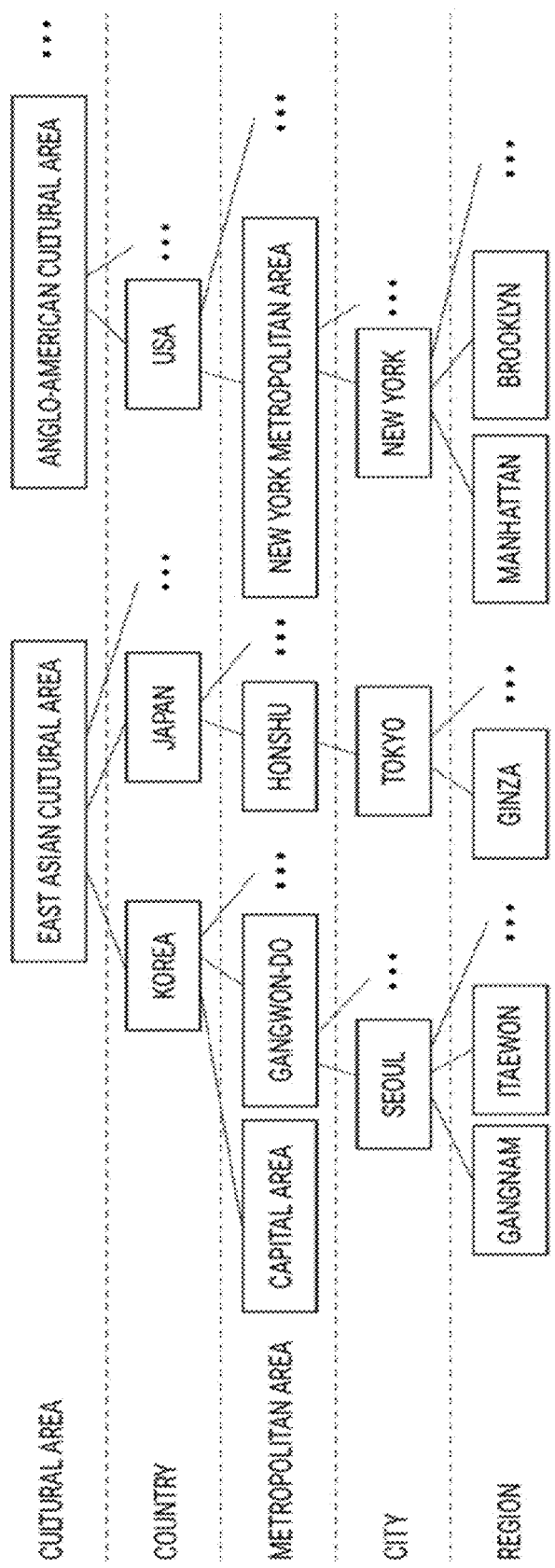
FIG. 6 is a graph showing at least two lists according to an embodiment.

FIG. 6 is a graph showing at least two lists, according to an embodiment. The graph shown in FIG. 6 includes a plurality of vertices and edges connecting the vertices to one another. Each vertex included in the graph may correspond to one list. The lists may respectively correspond to different values of a specific feature.

The graph shown in FIG. 6 includes two vertices that are connected to each other by an edge and included at different levels. The two vertices may include a first vertex included at a lower level and a second vertex included at a higher level. A range represented by a value corresponding to a list corresponding to the first vertex may be included in a range represented by a value corresponding to a list corresponding to the second vertex.

Referring to FIG. 6, the specific feature may be "location". A value corresponding to a list corresponding to a vertex included at the highest level of the graph shown in FIG. 6 may be a cultural area. In other words, the highest level of the graph shown in FIG. 6 may be a cultural area level. The cultural area level, which is the highest level, may include a vertex corresponding to "East Asian cultural area", a vertex corresponding to "Anglo-American cultural area", and the like.

At least one of items included in the list corresponding to the vertex corresponding to "East Asian cultural area" may correspond to "East Asian cultural area". In other words, a location of a waiting user corresponding to the item included in the list may be "East Asian cultural area".

Also, a value corresponding to a list corresponding to a vertex included at a subsequent lower level of the cultural area level may be a country. In other words, the subsequent lower level of the cultural area level may be a country level. The country level may include a vertex corresponding to "Korea", a vertex corresponding to "Japan", a vertex corresponding to "USA", and the like.

Among the vertices included in the country level, the vertices connected to the vertices corresponding to the vertex corresponding to "East Asian cultural area" by the edges may include the vertex corresponding to "Korea", the vertex corresponding to "Japan", and the like. Also, among the vertices included in the country level, the vertices connected to the vertices corresponding to "the Anglo-American cultural area" by the edges may include the vertex corresponding to "USA", and the like.

At least one of items included in the list corresponding to the vertex corresponding to "Korea" may correspond to "Korea". In other words, a location of a waiting user corresponding to the item included in the list may be "Korea".

Also, a value corresponding to a list corresponding to a vertex included at a subsequent lower level of the country level may be a specific metropolitan area. In other words, the subsequent lower level of the country level may be a metropolitan area level. The metropolitan area level may include a vertex corresponding to "capital area", a vertex corresponding to "Gangwon-do", a vertex corresponding to "Honshu", a vertex corresponding to "New York metropolitan area", and the like.

Among the vertices included in the metropolitan area level, the vertices connected to the vertices corresponding to "Korea" by the edges may include the vertex corresponding to "capital area", the vertex corresponding to "Gangwon-do", and the like. Also, among the vertices included in the metropolitan area level, the vertices connected to the vertices corresponding to "USA" by the edges may include the vertex corresponding to "New York metropolitan area", and the like.

At least one of items included in the list corresponding to the vertex corresponding to "capital area" may correspond to "capital area". In other words, a location of a waiting user corresponding to the item included in the list may be "capital area".

Also, a value corresponding to a list corresponding to a vertex included at a subsequent lower level of the metropolitan area level may be a specific city. In other words, the subsequent lower level of the metropolitan area level may be a city level. The city level may include a vertex corresponding to "Seoul", a vertex corresponding to "Tokyo", a vertex corresponding to "New York", and the like.

Also, among the vertices included in the city level, the vertices connected to the vertices corresponding to "capital area" by the edges may include the vertex corresponding to "Seoul", and the like. Also, among the vertices included in the city level, the vertices connected to the vertices corresponding to "New York metropolitan area" by the edges may include the vertex corresponding to "New York", and the like.

At least one of items included in the list corresponding to the vertex corresponding to "Seoul" may correspond to "Seoul". In other words, a location of a waiting user corresponding to the item included in the list may be "Seoul".

Also, a value corresponding to a list corresponding to a vertex included at a subsequent lower level of the city level may be a specific region. In other words, the subsequent lower level of the city level may be a region level. The region level may include a vertex corresponding to "Gangnam", a vertex corresponding to "Itaewon", a vertex corresponding to "Ginza", a vertex corresponding to "Manhattan", a vertex corresponding to "Brooklyn", and the like.

Among the vertices included in the region level, the vertices connected to the vertices corresponding to "Seoul" by the edges may include the vertex corresponding to "Gangnam", the vertex corresponding to "Itaewon", and the like. Also, among the vertices included in the region level, the vertices connected to the vertices corresponding to "New York" by the edges may include the vertex corresponding to "Manhattan", the vertex corresponding to "Brooklyn", and the like.

At least one of items included in the list corresponding to the vertex corresponding to "Gangnam" may correspond to "Gangnam". In other words, a location of a waiting user corresponding to the item included in the list may be "Gangnam".

Referring to FIG. 3 again, the mediating method according to an embodiment may include operation S110 of receiving first information about the first terminal 200 or the user of the first terminal 200 from the first terminal 200. The input interface 120 of the mediating device 100 may receive information about the first terminal 200 or information about the user of the first terminal 200 from the first terminal 200. The storage 110 of the mediating device 100 may store the information received from the first terminal 200.

The first information may include the information about the first terminal 200. For example, the first information may include location information, network address information, or model information of the first terminal 200. The first information may include the information about the user of the first terminal 200. For example, the first information may include location information, gender information, age information, job information, interest information, ethnicity information, religion information, command-of-language information, or favorite partner condition information of the user of the first terminal 200.

The favorite partner condition information of the user of the first terminal 200 may include at least one of location information, gender information, age information, job information, interest information, ethnicity information, religion information, command-of-language information, or favorite partner condition information of a partner whom the user of the first terminal 200 wants to match.

Next, the mediating method according to an embodiment may include operation S120 of deriving a value corresponding to the specific feature using the received first information. The controller 130 of the mediating device 100 may derive the value corresponding to the specific feature using the received first information. For example, it is assumed that the feature of the value corresponding to the list prepared through operation S100 of preparing the at least two lists is "location". The controller 130 may derive the value corresponding to "location" by extracting at least a part of the first information or converting at least a part of the first information.

For example, when the first information includes a location value of the user of the first terminal 200, the controller 130 may derive the value corresponding to "location" by extracting the location value from the first information. As another example, when the first information includes location information of the user of the first terminal 200, the controller 130 may extract the location information from the first information. The controller 130 may derive the value corresponding to "location" by converting the extracted location information into a value. As another example, when the first information includes network address information of the first terminal 200, the controller 130 may extract the network address information from the first information. The controller 130 may derive the value corresponding to "location" by converting the extracted network address information into a location value of the first terminal 200.

The mediating method according to an embodiment may include operation S130 of selecting a first list from among the at least two lists using the derived value. The controller 130 of the mediating device 100 may select the first list from among the at least two lists using the derived value.

For example, it is assumed that the derived value is "Gangnam". The controller 130 may select a list corresponding to "Gangnam" from among the at least two lists. At least one of items included in the selected list may correspond to "Gangnam". In other words, a location of a waiting user corresponding to the item included in the selected list may be "Gangnam".

For example, it is assumed that the derived value is "Jongno". The controller 130 may determine whether a list accurately corresponding to "Jongno" is present in the at least two lists. When the controller 130 determines that the list accurately corresponding to "Jongno" is present, the controller 130 may select the list accurately corresponding to "Jongno".

It is assumed that the controller 130 determines that the list accurately corresponding to "Jongno" is not present. The controller 130 may select a list corresponding to a region closest from "Jongno" from among the lists corresponding to the vertices included at the region level of FIG. 6. In FIG. 6, it is assumed that only the vertex corresponding to "Gangnam" and the vertex corresponding to "Itaewon" are present as the vertices that are connected to the vertex corresponding to "Seoul" and included at the region level.

Since "Itaewon" between "Gangnam" and "Itaewon" is the region closest from "Jongno", the controller 130 may select the list corresponding to the vertex corresponding to "Itaewon".

According to another embodiment, when the controller 130 determines that the list accurately corresponding to "Jongno" is not present, the controller 130 may select a list corresponding to a value including a range represented by "Jongno" from among the at least two lists. In other words, the controller 130 may select a list corresponding to a city including a "Jongno" region.

Since the "Jongno" region is included in "Seoul", the controller 130 may select the list corresponding to "Seoul". Instead of selecting the list corresponding to "Seoul", the controller 130 may select a list corresponding to a value of a higher level including the "Jongno" region. Referring to FIG. 6, the controller 130 may select the list corresponding to the vertex corresponding to the city, the metropolitan area, the country, or the cultural area including the "Jongno" region. In other words, the controller 130 may select the list corresponding to "Seoul", "capital area", "Korea", or "East Asian cultural area".

According to another embodiment, when the controller 130 determines that the list accurately corresponding to "Jongno" is not present, the controller 130 may newly generate the list accurately corresponding to "Jongno" and select the generated list. Also, the vertex corresponding to "Jongno" may be newly added to the region level of FIG. 6. Since the "Jongno" region is included in "Seoul", the vertex corresponding to "Jongno" may be connected to the vertex corresponding to "Seoul" by the edge.

Referring to FIG. 3 again, the mediating method according to an embodiment may include operation S140 of determining whether a first item matching the user of the first terminal 200 is present in the at least one item included in the first list using the first information. The controller 130 of the mediating device 100 may determine whether the first item is present in the first list using the first information.

Figure 7:
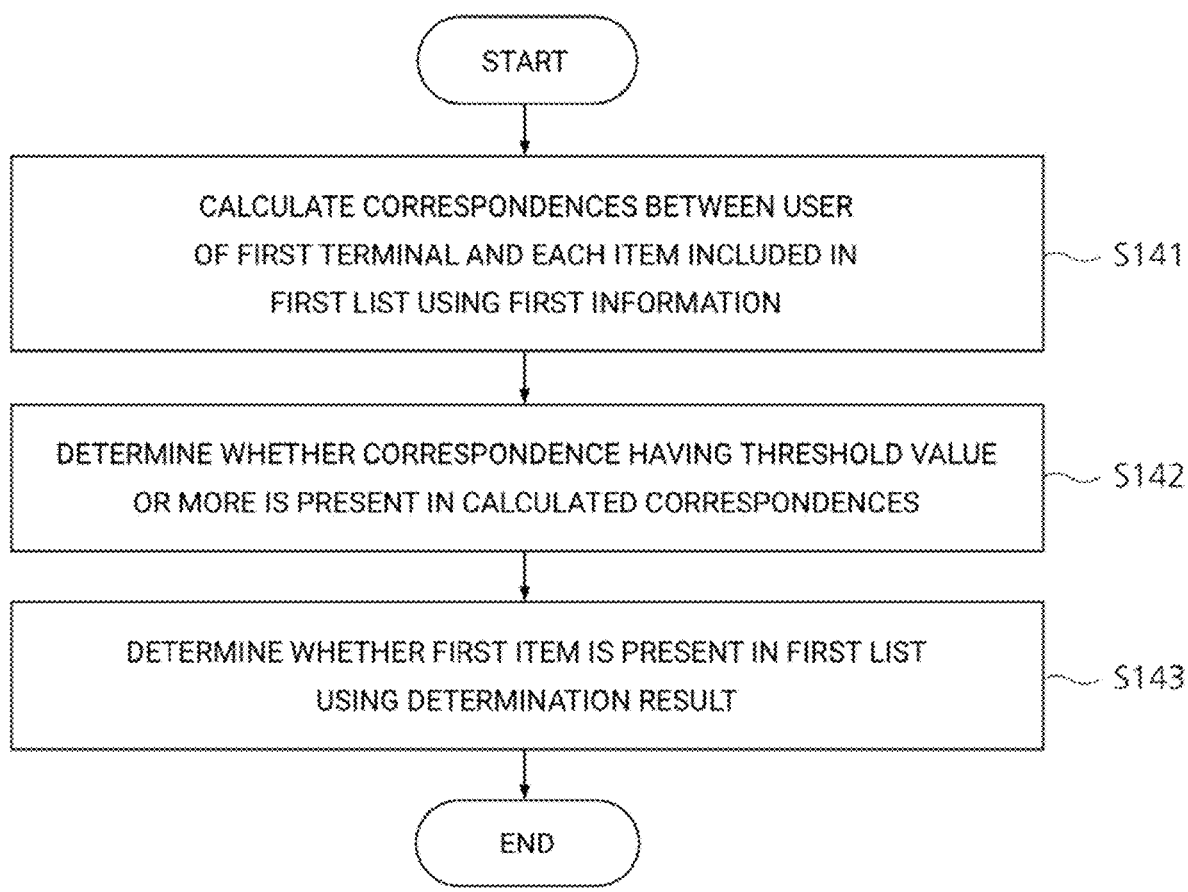
FIG. 7 is a flowchart of a process of determining whether a first item is present in items included in a first list, according to an embodiment.

FIG. 7 is a flowchart of operation S140 of determining whether the first item is present in the items included in the first list. Referring to FIG. 7, operation S140 may include operation S141 of calculating correspondences between the user of the first terminal 200 and each item included in the first list using the first information. The controller 130 of the mediating device 100 may calculate the correspondence between the user of the first terminal 200 and each item included in the first list using the first information.

The controller 130 may compare at least one factor included in the first information with at least one factor included in information about a waiting user corresponding to each item included in the first list. The controller 130 may select at least one first factor from among the factors included in the first information. The controller 130 may select a second factor corresponding to the at least one first factor included in the information about the waiting user. The controller 130 may compare the first factor with the second factor corresponding to the first factor.

The controller 130 may compare at least one of location information, network address information, and model information of the first terminal 200, and location information, gender information, age information, job information, interest information, ethnicity information, religion information, command-of-language information, or favorite partner condition information of the user of the first terminal 200, as the at least one factor included in the first information.

The controller 130 may compare at least one of location information, network address information, and model information of the terminal used by the waiting user, and location information, gender information, age information, job information, interest information, ethnicity information, religion information, command-of-language information, or favorite partner condition information of the waiting user, as the at least one factor included in the information about the waiting user.

The controller 130 may calculate a correspondence score of each first factor through the comparison. The controller 130 may calculate the correspondence score from the first factor and the second factor corresponding to the first factor using a specific algorithm.

The correspondence score of each first factor may be calculated using different methods for each first factor. For example, a correspondence score of a third factor included in the first information may be higher as the third factor and a fourth factor included in the information about the waiting user become more similar to each other. As another example, a correspondence score of a fifth factor included in the first information may be higher as the fifth factor and a sixth factor included in the information about the waiting user become more different from each other. As another example, a correspondence score of a seventh factor included in the first information may be higher as a correlation between the seventh factor and an eighth factor included in the information about the waiting user become closer to a specific correlation.

For example, as the factor included in the first information, the interest of the user of the first terminal 200 may be "baseball". As the factor included in the information about the waiting user corresponding to the specific item included in the first list, the job of the waiting user may be a "baseball player". The controller 130 may compare the interest of the user of the first terminal 200 with the job of the waiting user. In the above case, the controller 130 may calculate a higher correspondence score of the factor than in a case where the interest of the user of the first terminal 200 is "baseball" and the job of the waiting user is "architect".

As another example, the controller 130 may compare the interest of the user of the first terminal 200 as the factor included in the first information with the interest of the waiting user as the factor included in the information about the waiting user. The controller 130 may calculate a higher correspondence score of the factor as the interest of the user of the first terminal 200 and the interest of the waiting user become more similar to each other.

As another example, the controller 130 may compare the location of the user of the first terminal 200 as the factor included in the first information with the location of the waiting user as the factor included in the information about the waiting user. The controller 130 may calculate a higher correspondence score of the factor as the location of the user of the first terminal 200 and the location of the waiting user become closer to each other.

As another example, the controller 130 may compare the gender of the user of the first terminal 200 as the factor included in the first information with the gender of the waiting user as the factor included in the information about the waiting user. In a case where the gender is the same as the gender of the waiting user, the controller 130 may calculate a higher correspondence score of the factor than in a case where the gender of the user of the first terminal 200 is different from the gender of the waiting user.

As another example, as the factor included in the first information, the favorite partner condition of the user of the first terminal 200 may be that "the interest of the partner is basketball". As the factor included in the information about the waiting user, the interest of the waiting user may be "basketball". The controller 130 may compare the favorite partner condition of the user of the first terminal 200 with the interest of the waiting user. In the above case, the controller 130 may calculate a higher correspondence score of the factor than in a case where the favorite partner condition of the user of the first terminal 200 is the same as described above and the interest of the waiting user is "music".

As another example, the controller 130 may compare the age of the user of the first terminal 200 as the factor included in the first information with the age of the waiting user as the factor included in the information about the waiting user. The controller 130 may calculate a higher correspondence score of the factor as a difference between the age of the user of the first terminal 200 and the age of the waiting user becomes closer to three years.

The controller 130 may calculate a correspondence between the user of the first terminal 200 and the specific item included in the first list by calculating the weighted sum of the correspondence scores of the factors. In other words, the controller 130 may calculate a final correspondence by summing the products of the correspondence scores of the factors and weights for the factors.

The controller 130 may select the specific item from among the at least one item included in the first list and calculate the correspondence between the user of the first terminal 200 and the specific item. Also, the controller 130 may calculate the correspondences of the items by repeating the above-described method with respect to the other items except for the specific item among the items included in the first list. The controller 130 may calculate the correspondences of at least a part of the items included in the first list.

Referring to FIG. 7 again, operation S140 may include operation S142 of determining whether a correspondence having a threshold value or more is present in the calculated correspondences. The storage 110 of the mediating device 100 may store the threshold value in advance. The controller 130 of the mediating device 100 may determine whether the correspondence having the threshold value or more is present in the correspondences calculated with respect to the items included in the first list.

Operation S140 may include operation S143 of determining whether the first item is present in the first list using the determination result. When it is determined that the correspondence having the threshold value or more is present in the calculated correspondences, the controller 130 of the mediating device 100 may determine that the first item is present in the first list. When it is determined that the correspondence having the threshold value or more is not present in the calculated correspondences, the controller 130 may determine that the first item is not present in the first list.

The controller 130 may select an item corresponding to the correspondence having the threshold value or more, as the first item matching the user of the first terminal. When there are a plurality of items corresponding to the correspondence having the threshold value or more, the controller 130 may select an arbitrary item from among the plurality of items as the first item.

Referring to FIG. 3 again, the mediating method according to an embodiment may include operation S150 of processing at least one of the at least two lists based on the determination result. The controller 130 of the mediating device 100 may process the at least one list based on the determination result.

Figure 8:
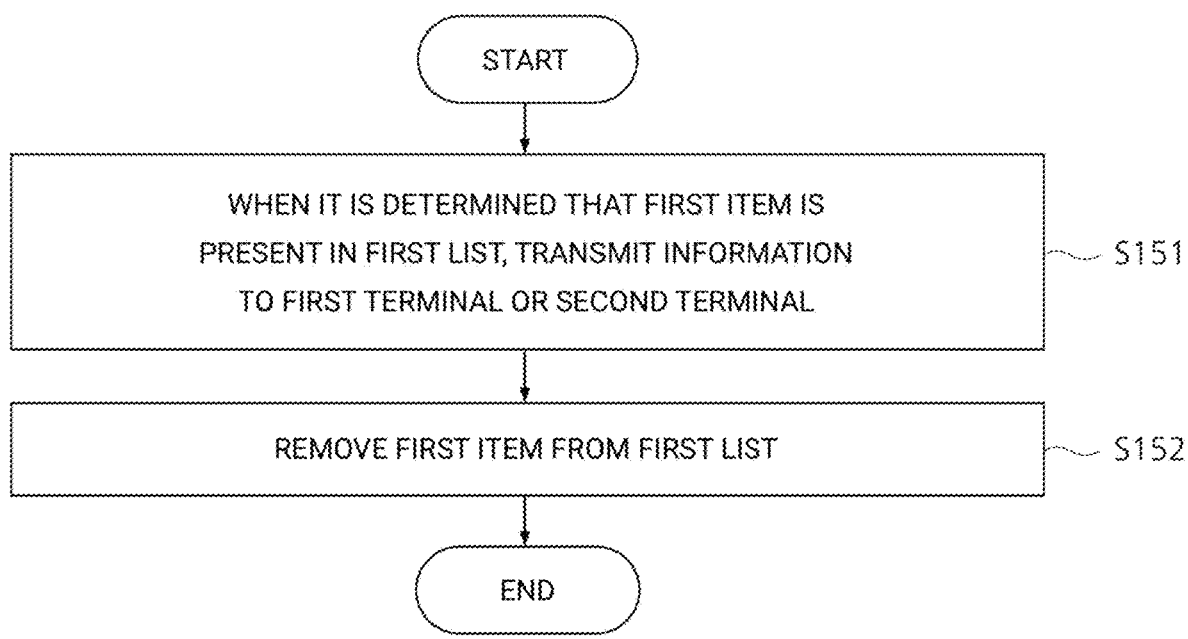
FIG. 8 is a flowchart of a process of processing at least one list based on a determination result, according to an embodiment.

FIG. 8 is a flowchart of operation S150 of processing the at least one list based on the determination result. Referring to FIG. 8, operation S150 may include operation S151 of, when it is determined that the first item is present in the first list, transmitting second information corresponding to the first item to the first terminal 200, or transmitting third information corresponding to the first terminal 200 or the user of the first terminal 200 to the second terminal 210 corresponding to the first item.

The output interface 140 of the mediating device 100 may transmit the second information to the first terminal 200. The second information may correspond to the selected first item. The second information may include the information about the waiting user corresponding to the first item or the information about the terminal used by the waiting user.

The information about the waiting user may include location information, gender information, age information, job information, interest information, ethnicity information, religion information, command-of-language information, or favorite partner condition information of the waiting user. The information about the terminal used by the waiting user may include location information, network address information, or model information of the terminal.

The first terminal 200 may receive the second information. The first terminal 200 may display at least a part of the received second information on a display included in the first terminal 200. The first terminal 200 may display, on the display, the information about the waiting user that is included in the second information. Also, using the second information, the first terminal 200 may be connected to the terminal used by the waiting user. The first terminal 200 may attempt connection to the terminal using the network address information of the terminal used by the waiting user, which is included in the second information.

When the first terminal 200 is connected to the terminal used by the waiting user, the first terminal 200 and the terminal used by the waiting user may exchange messages, files, images, or videos with each other. Also, the first terminal 200 and the terminal used by the waiting user, which are connected to each other, may make a phone call or a video call to each other. The first terminal 200 and the terminal used by the waiting user may exchange messages with each other via or without via the mediating device 100.

According to another embodiment, the output interface 140 may transmit third information to the second terminal 210 corresponding to the selected first item. The third information may include the information about the first terminal 200 or the information about the user of the first terminal 200. The output interface 140 may transmit the third information to the terminal used by the waiting user corresponding to the first item. In other words, the second terminal 210 may be the terminal used by the waiting terminal corresponding to the first item.

The information about the first terminal 200 may include location information, network address information, or model information of the first terminal 200. The information about the user of the first terminal 200 may include location information, gender information, age information, job information, interest information, ethnicity information, religion information, command-of-language information, or favorite partner condition information of the user.

The second terminal 210 may receive the third information. The second terminal 210 may display at least a part of the received third information on a display included in the second terminal 210. The second terminal 210 may display, on the display, the information about the user of the first terminal 200 that is included in the third information. Also, using the third information, the second terminal 210 may be connected to the first terminal 200. The second terminal 210 may attempt connection to the first terminal using the network address information of the first terminal 200 that is included in the third information.

As described above, the mediating device 100 may mediate between the user of the first terminal 200 and the user of the second terminal 210 by transmitting the second information to the first terminal 200 or transmitting the third information to the second terminal 210. In other words, the mediating device 100 may mediate between the user of the first terminal 200 and the waiting user corresponding to the first item.

Operation S150 may include operation S152 of, when it is determined that the first item is present in the first list, removing the first item from the first list. Since the mediation is performed such that the user of the first terminal 200 is connectable to the waiting user corresponding to the first item, the storage 110 of the mediating device 100 may remove the first item from the first list.

Figure 9:
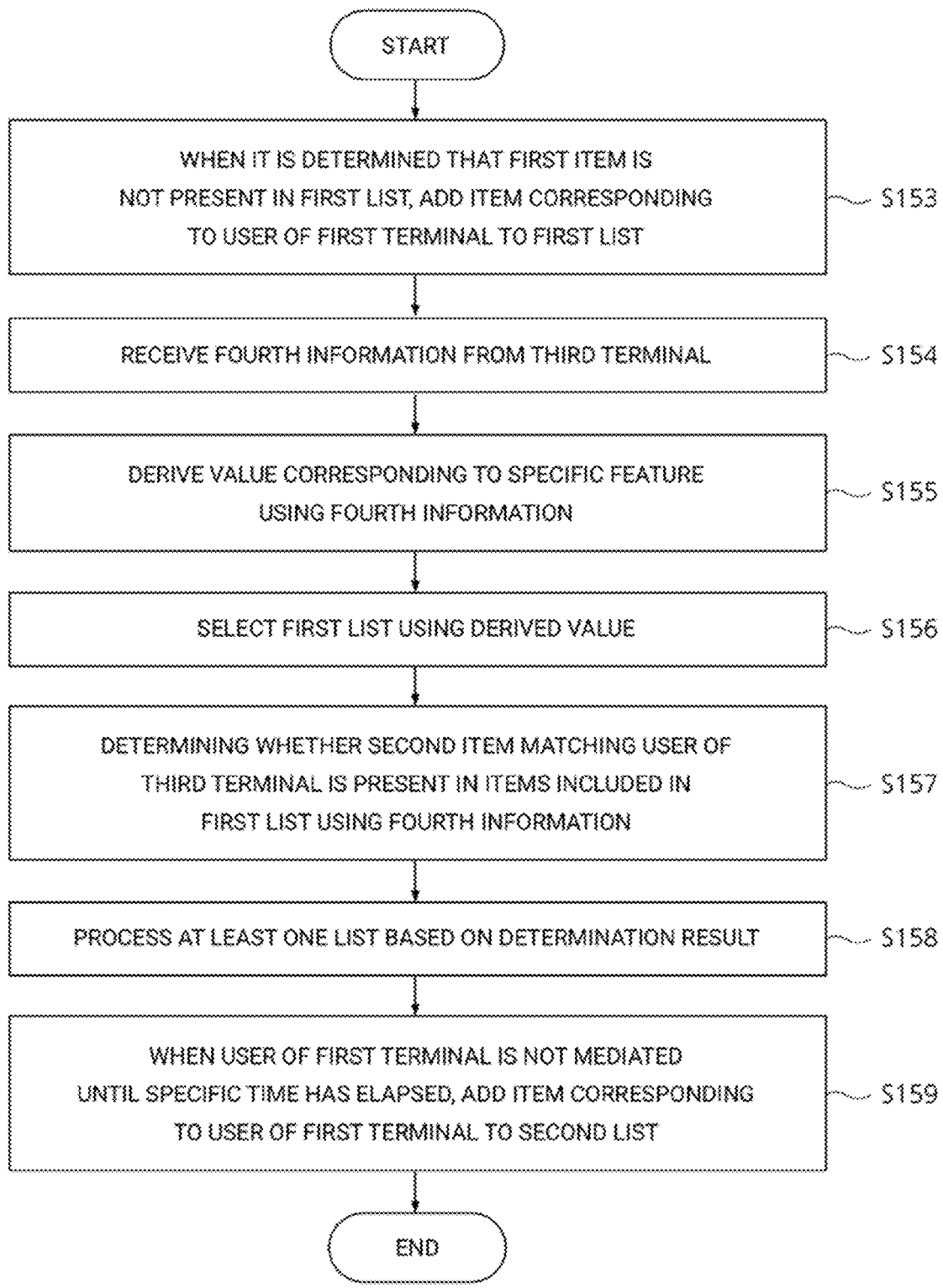
FIG. 9 is a flowchart of a process of processing at least one list based on a determination result, according to another embodiment.

FIG. 9 is a flowchart of operation S150 of processing the at least one list based on the determination result, according to another embodiment. Referring to FIG. 9, operation S150 may include operation S153 of, when it is determined that the first item is not present in the first list, adding an item corresponding to the user of the first terminal 200 to the first list.

When it is determined that the item matching the user of the first terminal 200 is not present in the first list, the user of the first terminal 200 may be a waiting user who must wait for mediation with another user. Therefore, the controller 130 of the mediating device 100 may newly generate the item corresponding to the user of the first terminal 200. The storage 110 of the mediating device 100 may store the newly generated item to the first list.

The newly generated item may include the information or identifier about the first terminal 200 or the user of the first terminal 200. The information about the first terminal 200 may include location information, network address information, or model information of the first terminal 200. The information about the user of the first terminal 200 may include location information, gender information, age information, job information, interest information, ethnicity information, religion information, command-of-language information, or favorite partner condition information of the user.

Operation S150 may include operation S154 of receiving fourth information about the third terminal 220 or the user of the third terminal 220 from the third terminal 220. Similarly to operation S110 of receiving the first information, the input interface 120 of the mediating device 100 may receive information about the third terminal 220 or information about the user of the third terminal 220 from the third terminal 220. The storage 110 of the mediating device 100 may store the information received from the third terminal 220.

Operation S150 may include operation S155 of deriving a value corresponding to the specific feature using the received fourth information. Similarly to operation S120 of deriving the value corresponding to the specific feature using the received first information, the controller 130 of the mediating device 100 may derive the value corresponding to the specific feature using the received fourth information.

Operation S150 may include operation S156 of selecting the first list from among the at least two lists using the derived value. Similarly to operation S130 of selecting the first list, the controller 130 of the mediating device 100 may select one list from among the at least two lists using the derived value. For example, the controller 130 may select the first list that includes the item corresponding to the first terminal 200.

Operation S150 may include operation S157 of determining whether a second item matching the user of the third terminal 220 is present in the at least one item included in the first list using the fourth information. Similarly to operation S140 of determining whether the first item is present, the controller 130 of the mediating device 100 may determine whether the second item is present in the first list using the fourth information.

Operation S150 may include operation S158 of processing at least one of the at least two lists based on the determination result. The controller 130 of the mediating device 100 may process the at least one list based on the determination result.

The controller 130 may process the at least one list using a method similar to the embodiment illustrated in FIG. 8. Also, the controller 130 may process the at least one list using a method similar to the embodiment illustrated in FIG. 9. Also, the controller 130 may process the at least one list using a method similar to the embodiment illustrated in FIG. 10.

For example, when it is determined that the second item is present in the first list, the controller 130 may transmit fifth information corresponding to the second item to the third terminal 220. According to another embodiment, the output interface 140 may transmit sixth information corresponding to the third terminal 220 or the user of the third terminal 220 to the fourth terminal corresponding to the second item.

The fourth terminal may be identical to the first terminal 200. In other words, the second item may be identical to the item corresponding to the user of the first terminal 200 added to the first list. According to another embodiment, the fourth terminal may be different from the first terminal 200. In other words, the second item may be different from the item corresponding to the user of the first terminal 200.

After the item corresponding to the user of the first terminal 200 is added to the first list, operations from operation S154 of receiving the fourth information to operation S158 of processing the at least one list may be repeatedly performed. Whenever the operations from operation S154 of receiving the fourth information to operation S158 of processing the at least one list are repeatedly performed, the third terminal 220 and the fourth information corresponding to the third terminal 220 may be changed.

Referring to FIG. 9 again, operation S150 may include operation S159 of, when the user of the first terminal 200 is not mediated until a specific time has elapsed, adding the item corresponding to the user of the first terminal 200 to a second list that is different from the first list. The specific time may be, for example, 5 seconds.

After the item corresponding to the user of the first terminal 200 is added to the first list, the user of the first terminal 200 may not be mediated until the specific time has elapsed. The mediating device 100 may add the item corresponding to the user of the first terminal 200 to the second list so as to increase a possibility that the user of the first terminal 200 will be mediated.

The controller 130 of the mediating device 100 may select the second list using the value of the specific feature corresponding to the first list. For example, it is assumed that the specific feature is "location" and the value corresponding to the first list is "Gangnam". The controller 130 may select, as the second list, a list corresponding to a value closest to the value of the specific feature corresponding to the first list. For example, the controller 130 may select the list corresponding to "Itaewon" as the second list.

According to another embodiment, the controller 130 may select, as the second list, a list corresponding to a value including a range represented by the value of the specific feature corresponding to the first list. In other words, the controller 130 may select a list corresponding to a value of an upper-level concept than the value corresponding to the first list. For example, the controller 130 may select the list corresponding to "Seoul" as the second list.

The mediating device 100 may remove the item corresponding to the user of the first terminal 200 from the first list together with the addition to the second list. In other words, the item corresponding to the user of the first terminal 200 may be moved from the first list to the second list.

According to another embodiment, the mediating device 100 may not remove the item corresponding to the user of the first terminal 200 from the first list together with the addition to the second list. In other words, the item corresponding to the user of the first terminal 200 may be redundantly added to the second list while being included in the first list.

Also, after the item corresponding to the user of the first terminal 200 is added to the second list, the user of the first terminal 200 may not be mediated again until the specific time has elapsed. The mediating device 100 may repeatedly add the item corresponding to the user of the first terminal 200 to another list whenever the specific time has elapsed.

FIG. 10 is a flowchart of operation S150 of processing the at least one list based on the determination result, according to another embodiment. Referring to FIG. 10, operation S150 may include operation S253 of, when it is determined that the first item is not present in the first list, determining whether the first item is present in the at least one item included in a second list different from the first list using the first information.

It may be determined that the first item matching the user of the first terminal 200 is not present in the first list. The controller 130 of the mediating device 100 may select the second list that is different from the first list. The controller 130 may select the second list using the value of the specific feature corresponding to the first list.

For example, it is assumed that the specific feature is "location" and the value corresponding to the first list is "Gangnam". The controller 130 may select, as the second list, a list corresponding to a value closest to the value of the specific feature corresponding to the first list. For example, the controller 130 may select the list corresponding to "Itaewon" as the second list.

According to another embodiment, the controller 130 may select, as the second list, a list corresponding to a value including a range represented by the value of the specific feature corresponding to the first list. In other words, the controller 130 may select a list corresponding to a value of an upper-level concept than the value corresponding to the first list. For example, the controller 130 may select the list corresponding to "Seoul" as the second list.

The controller 130 may determine whether the item matching the user of the first terminal 200 is present in the items included in the selected second list using the first information. The controller 130 may determine whether the item matching the user of the first terminal 200 is present in the items included in the second list, using a method similar to the embodiment illustrated in FIG. 7.

Referring to FIG. 10 again, operation S150 may include operation S254 of processing at least one of the at least two lists based on the determination result. The controller 130 of the mediating device 100 may process the at least one list based on the determination result.

The controller 130 may process the at least one list using a method similar to the embodiment illustrated in FIG. 8. Also, the controller 130 may process the at least one list using a method similar to the embodiment illustrated in FIG. 9. Also, the controller 130 may process the at least one list using a method similar to the embodiment illustrated in FIG. 10.

For example, when it is determined that the first item is present in the second list, the output interface 140 of the mediating device 100 may transmit information corresponding to the first item in the second list to the first terminal 200. The information corresponding to the first item may include the information about the waiting user corresponding to the first item or the information about the terminal used by the waiting user. According to another embodiment, the output interface 140 may transmit the information corresponding to the user of the terminal 200 or the user of the first terminal 200 to the terminal used by the waiting user corresponding to the first item.

Also, it may be determined that the first item is not present in the second list. The controller 130 of the mediating device 100 may newly select a list and repeat the process of determining whether the first item is present in the selected list.

The controller 130 may repeat the above processes a predetermined number of times calculated based on information set in advance by the user. For example, it may be set by the user such that whether the first item is present is determined with respect to only the lists corresponding to the levels lower than the "country" level. The controller 130 may repeat the above process with respect to only the lists corresponding to the levels lower than the "country" level.

Also, after the above process is repeated, it may be determined that the first item is not present in all the lists checked while the above process is repeated. The controller 130 may add the item corresponding to the user of the first terminal 200 to at least one of the lists checked while the above process is repeated. For example, the controller 130 may add the item corresponding to the user of the first terminal 200 to the first list or the second list.

According to the above-described embodiments, the plurality of terminals 200, 210, and 220 may match one another more effectively. Also, the terminal of the user may match the terminal of another user that is more suitable for the user among a plurality of users. Also, different users may make a video call more effectively using their own terminals.

According to one or more embodiments, the plurality of terminals may match one another more effectively.

According to one or more embodiments, the terminal of the user may match the terminal of another user that is more suitable for the user among the plurality of users.

According to one or more embodiments, different users may make a video call more effectively using their own terminals.

Embodiments may be embodied in a non-transitory computer-readable recording medium having recorded thereon computer-executable instruction codes, such as a program module executable by the computer. The non-transitory computer-readable recording medium may be any available medium which can be accessed by the computer and may include any volatile and non-volatile media and any removable and non-removable media.

Furthermore, the non-transitory computer-readable recording medium may include any computer storage medium and communication medium. The computer storage medium may include any volatile and non-volatile media or any removable and non-removable media embodied by a certain method or technology for storing information such as computer-readable instruction codes, a data structure, a program module, or other data. The communication medium may include computer-readable instruction code, a data structure, a program module, other data of modulated data signals, or other transmission mechanisms, and may include any information transmission medium.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A method of selecting online conversation partners among waiting users, the method comprising:
   receiving, from a plurality of computing terminals, information relating to a plurality of waiting users who are currently waiting for an online conversation, wherein information relating to each waiting user comprises values specific to the waiting user for predetermined characteristics that comprise two or more characteristics selected from the group consisting of geographical location, gender, age, occupation, interests, ethnicity, religion, and language;
   processing at least part of the information to prepare a plurality of lists comprising a first list and a second list, wherein each list comprises one or more items, each of which corresponds to one of the plurality of waiting users, wherein the plurality of lists are prepared based on a selected one of the predetermined characteristics such that each item in the first list corresponds to one waiting user having a first value for the selected characteristic and further such that each item in the second list corresponds to one waiting user having a second value for the selected characteristic, wherein the first value differs from the second value;
   processing first information relating to a first waiting user to obtain a value specific to the first waiting user for the selected characteristic;
   locating a first one of the plurality of lists that comprises one or more items corresponding to one or more waiting users who have the same value for the selected characteristic as the first waiting user;
   finding, in the first list, a matching item that matches the first waiting user; and
   subsequently communicating to at least one of a first terminal associated with the first waiting user and a second terminal associated with a second waiting user that corresponds to the matching item so that the first waiting user and the second waiting user initiate an online conversation.

2. The method of claim 1, wherein the predetermined characteristics comprise at least one selected from the group consisting of geographical location, gender, age, and language.

3. The method of claim 1, wherein the geographical location further comprises country and city.

4. The method of claim 1, wherein the predetermined characteristics comprise at least one selected from the group consisting of geographical location, gender, age, and language, wherein the selected characteristic is one selected from the group consisting of geographical location, gender, age, and language.

5. The method of claim 4, wherein the geographical location further comprises country and city.

6. The method of claim 1, wherein the selected characteristic is country, wherein the first information relating to the first waiting user comprises a first country, wherein the value specific to the first waiting user for the selected characteristic of country is the first country, wherein each of the one or more waiting users corresponding to the one or more items of the first list has the first country for the selected characteristic of country.

7. The method of claim 6, wherein an item corresponding to the second waiting user belongs to the first list as the second information relating to the second waiting user comprises the first country for the selected characteristic of country.

8. The method of claim 7, wherein the first information relating to the first waiting user further comprises one or more selected from the group consisting of a first city, a first gender, a first age, a first occupation, a first interest, a first ethnicity, a first religion, and a first language, wherein finding the matching item comprises determining that the second information relating to the second waiting user comprises at least one of the one or more selected from the group consisting of a first city, a first gender, a first age, a first occupation, a first interest, a first ethnicity, a first religion, and a first language.

9. The method of claim 7, wherein the first information relating to the first waiting user further comprises one or more selected from the group consisting of a first city, a first gender, a first age, a first occupation, a first interest, a first ethnicity, a first religion, and a first language, wherein finding the matching item comprises determining that the first information relating to the first waiting user and the second information relating to the second waiting user have at least one common characteristic in addition to the first country.

10. The method of claim 1, wherein communicating to at least one of the first terminal and the second terminal comprises transmitting, to the first terminal, at least part of second information relating to the second waiting user.

11. The method of claim 1, wherein communicating to at least one of the first terminal and the second terminal comprises transmitting at least part of the first information to the second terminal.

12. A system for coordinating online conversations between users, the system comprising:
    at least one server configured to perform the method of claim 1.

13. A non-transitory computer-readable recording medium storing a program for executing the method of claim 1.

* * * * *